No. 796,884. PATENTED AUG. 8, 1905.
J. R. WEATHERLY.
STALK CUTTER.
APPLICATION FILED MAR. 21, 1905.
4 SHEETS—SHEET 1.
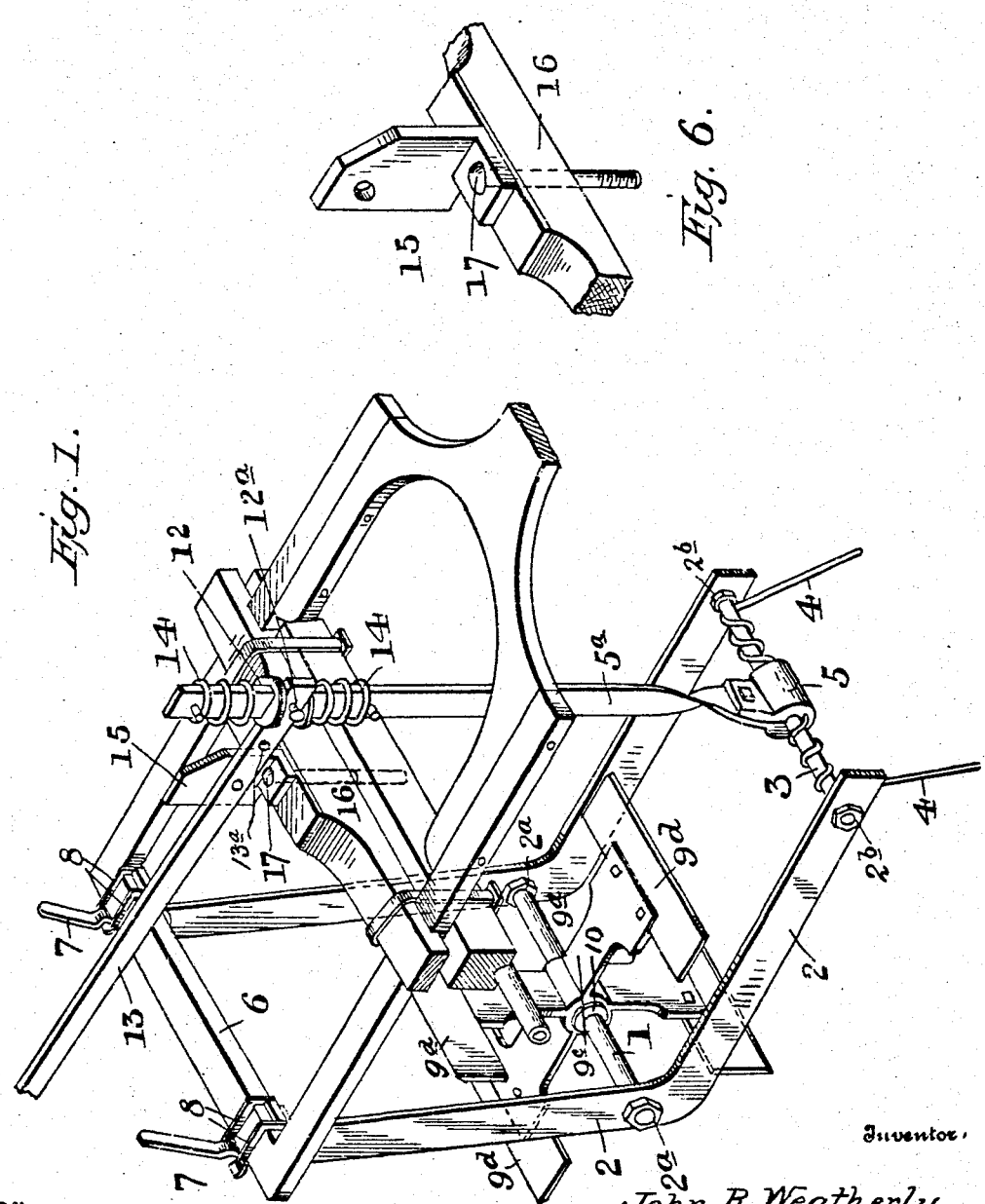
Inventor,
John R. Weatherly,

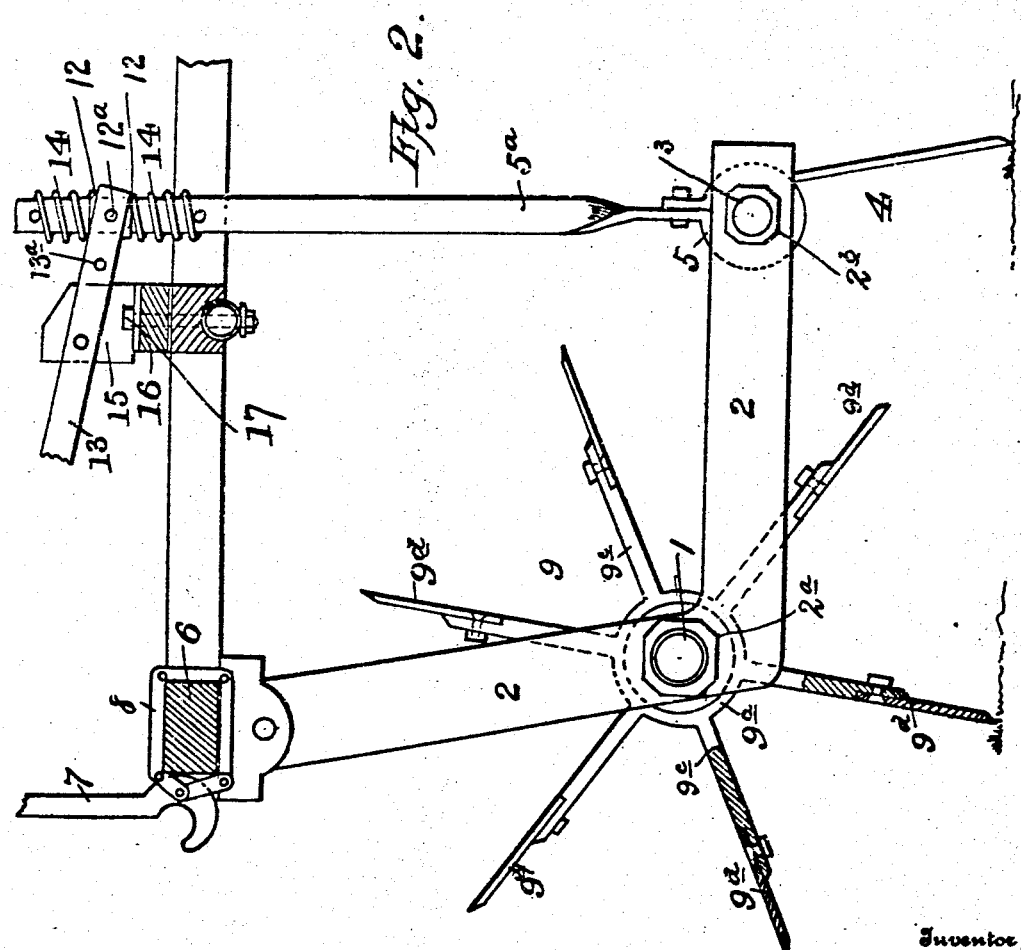

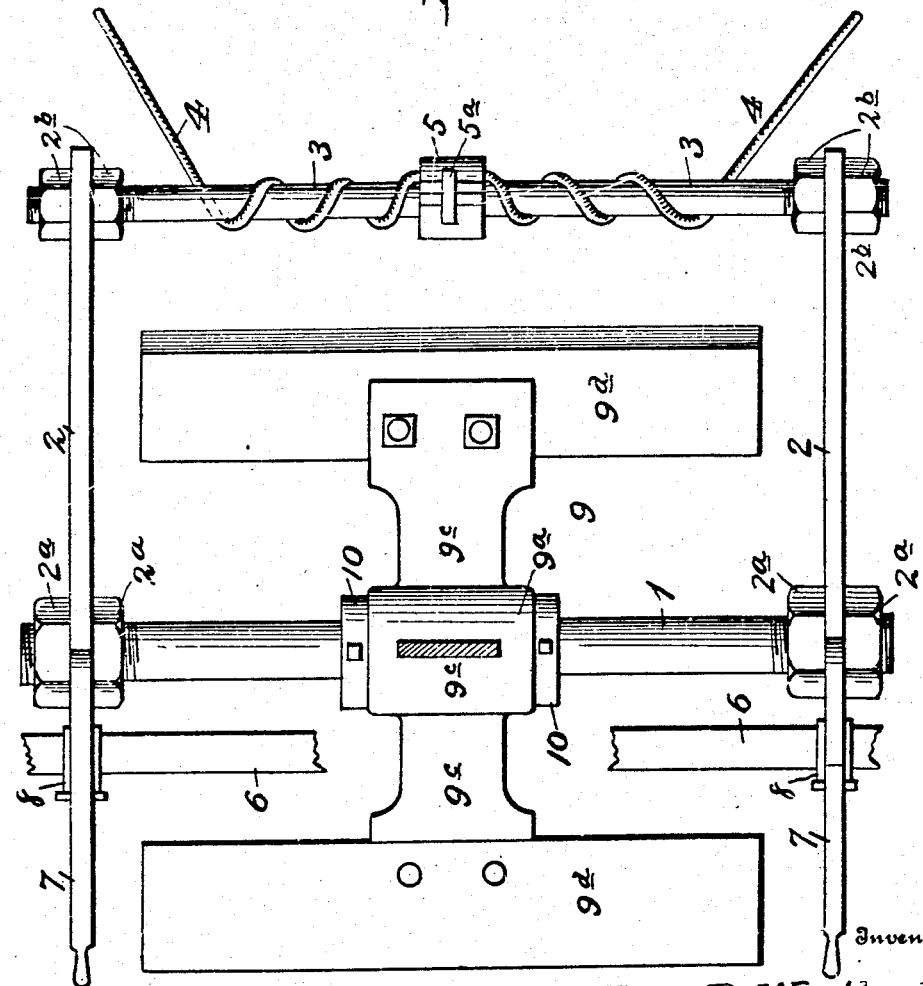

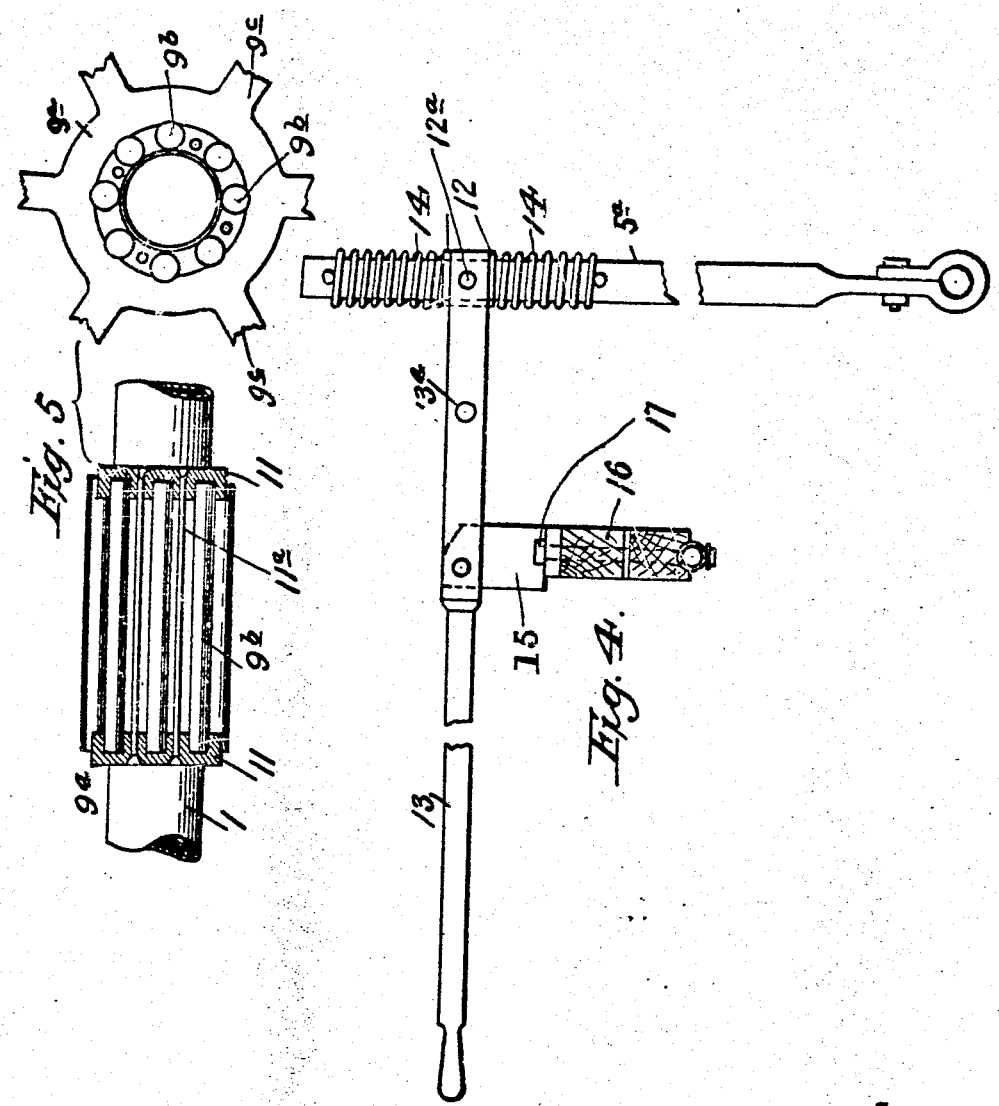

UNITED STATES PATENT OFFICE.

JOHN R. WEATHERLY, OF SUMTER, SOUTH CAROLINA, ASSIGNOR TO MABEL C. BRICE, OF AVON, SOUTH CAROLINA.

STALK-CUTTER.

No. 796,884.  Specification of Letters Patent.  Patented Aug. 8, 1905.

Application filed March 21, 1905. Serial No. 251,282.

*To all whom it may concern:*

Be it known that I, JOHN R. WEATHERLY, a citizen of the United States, residing at Sumter, in the county of Sumter and State of South Carolina, have invented new and useful Improvements in Stalk-Cutters, of which the following is a specification.

My invention relates to what may be characterized as an improved stalk-cutter attachment for wagons or vehicles, or, more specifically, which may be attached to the "running-gears" thereof.

Said invention has for its object, among other things, to readily bring into requisition the stalk-cutter attachment when desired for use and to provide for facility of adjustment of the attachment, also to simplify the construction and arrangement of the parts.

Said invention consists of certain structural features, substantially as hereinafter fully disclosed, and particularly pointed out by the claims.

In the accompanying drawings, illustrating the preferred embodiment of my invention, Figure 1 is a perspective view thereof as applied to the wagon running-gear in part. Fig. 2 is a side elevation, partly in section, of the attachment. Fig. 3 is an enlarged plan view thereof. Fig. 4 is a side view showing more especially the spring-pressure-retaining-rod connection between the forward end rod of the attachment-frame and the handled lever for manipulating or vertically adjusting said attachment. Fig. 5 is an enlarged longitudinal section of the frictional-roll bearing or box, also an end view thereof with parts broken away; and Fig. 6 is a fractional perspective view showing more particularly the fulcrum-support of the attachment-controlling lever.

In the carrying out of my invention I provide an axle or shaft 1, fixed by jam-nuts $2^a$ near or at its ends in right-angled lateral bars or arms 2, themselves secured, preferably, by jam-nuts $2^b$ at their forward ends upon a cross-rod 3, suitably equipped with spirally-ended spring-teeth 4 for aiding the disposing or gathering of the stalks in line with the stalk-cutters presently described. Said spirally-ended portions of said teeth are suitably secured to a split clutch or collar 5, clamped upon said rod 3, said teeth diverging downward and forward toward the ground for readily engaging and gathering the stalks for the purpose stated. The upper ends of said lateral bars or arms 2 are suitably clamped or held to what is termed the "slide-bar" 6 of the running-gear of the wagon or vehicle by means of eccentrically-actuated levers and chains or clips 7 and 8, respectively, for the ready securing and removal of the same when desired.

9 is a cutter comprising a central hub or box $9^a$, equipped with a circular series of antifrictional rolls $9^b$ upon its inner surface and a series of arms $9^c$ radiating from said box or hub and themselves equipped with peripheral blades or knives $9^d$ at right angles thereto. The hub or box has passing therethrough the axle or shaft 1, upon which latter said hub is suitably held by collars 10, secured upon said shaft by set-screws or otherwise. Inwardly from the latter are additional collars 11, applied to and receiving the ends of the rolls $9^b$ and themselves connected together by rod-bolts $11^a$ passing through both said box and said collars 11. The knives or blades are removably applied to the arms $9^c$, as shown, or otherwise, for convenience in sharpening the same when removed therefrom.

An extension of the collar 5 forms the lower end terminal of an upstanding bar or rod $5^a$, suitably passed and thus aided in being held in position through a loose collar 12, having a lateral screw-threaded connection, as at $12^a$, with a handle-lever 13, above and below which collar are arranged springs 14, held upon said rod or bar $5^a$, preferably by cross-pins passed through the latter. This arrangement provides for exerting a yielding pressure upon said rod or bar $5^a$ to hold the same with the cutter-carrying frame more effectively in position than would otherwise be the case and yet permit these parts to sufficiently yield for the easy adjustment or adaptation thereof to circumstances when in use. Said lever 13 is fulcrumed in a part or support 15, suitably secured to the front wagon-bolster 16 by a king-bolt 17. Said lever is adapted to extend sufficiently rearward for convenient manipulation or actuation by the driver seated upon the running-gear or wagon, as will be readily appreciated, for suitably adjusting the attachment. Said lever may have its fulcrum moved, as may be required, as suggested by the additional adjusting fulcrum-receiving hole $13^a$ therein.

From the foregoing it will be noted that the use of the heavy or cylinder form of cutter heretofore generally used among other forms is dispensed with and the machine or attachment therefore rendered relatively light and easier running, while equally if not more effective than the former.

Of course the device is aided in its attachment to the wagon or running-gear by suitably effecting connection therebetween by chains or like means.

Latitude is allowed as to details herein as they may be changed as circumstances suggest without departing from the spirit of my invention.

I claim—

1. An attachment of the character described, comprising a frame having lateral bars having hung therebetween a rotary chopper and their upper ends connected to means for the transportation thereof, an upright or suspending bar with its lower end connected to the forward connecting bar or rod of said lateral bars, and a manipulating-lever fulcrumed upon said transporting means and having one end connected to a collar arranged upon said upright or suspending bar and cushioned between springs also arranged upon the latter.

2. An attachment of the character described, comprising a frame having lateral bars having hung therebetween a rotary chopper and their upper ends connected to means for the transportation thereof, an upright or suspending bar with its lower end connected to the forward connecting bar or rod of said lateral bars, a manually-actuated lever fulcrumed upon said transporting means and having one end connected to a collar arranged upon said suspending-bar and cushioned between springs also arranged upon the latter, and raking-teeth dependable from said connecting bar or rod.

3. An attachment of the character described, comprising a transporting or carrying means, a frame having right-angled lateral bars, cam-bar-actuated shackles for effecting connection between said carrying means and clips to which are pivoted said lateral bars, a chopper rotatably journaled between said lateral bars, raking-teeth dependable from the forward connecting bar or rod of said lateral bars, in front of said chopper, a suspending-bar secured to said connecting bar or rod, and a manually-actuated lever fulcrumed upon said transporting or carrying means, and having one end connected to a collar arranged upon said suspending-bar and cushioned between springs also arranged upon the latter.

In testimony whereof I affix my signature in presence of two subscribing witnesses.

JOHN R. WEATHERLY.

Witnesses:
JOHN H. CLIFTON,
E. H. HOLMAN.